Oct. 30, 1923.

C. ALLEN

SLIME PULP THICKENER

Filed May 3, 1918

1,472,317

Inventor
Charles Allen
By Strong & Townsend
Attorneys

Patented Oct. 30, 1923.

1,472,317

UNITED STATES PATENT OFFICE.

CHARLES ALLEN, OF EL PASO, TEXAS.

SLIME-PULP THICKENER.

Application filed May 3, 1918. Serial No. 232,422.

*To all whom it may concern:*

Be it known that I, CHARLES ALLEN, a citizen of the United States, residing at El Paso, in the county of El Paso and State of Texas, have invented new and useful Improvements in Slime-Pulp Thickeners, of which the following is a specification.

This invention relates to a thickener for the suspension of solids in a liquid, and particularly to means for automatically and continuously maintaining a spigot discharge of uniform density.

Thickening, which is a partial dewatering of finely divided solids in suspension, is almost universally used in the treatment of ores by wet milling processes, and in its application it is of prime importance that the degree of thickening be uniform, that is, that the discharge of the thickening slime be always of the same uniform density.

In a suspension of solids in liquids the finely divided solids move freely without appreciably affecting the fluidity by friction among themselves. Such a thickened material has the properties of a liquid so long as the solids are kept in suspension. When the thickened material is composed of water and solid particles of greater specific gravity than water the specific gravity of the thickened material increases in proportion to an increase in the quantity of solids in suspension. This thickened material may therefore be considered as a liquid of greater specific gravity than water. The specific gravity of the pulp increases and decreases in proportion to the density of the pulp or the quantity of solids in suspension, and this feature is advantageously utilized in the operation of the present slime pulp thickener. This is accomplished in the present instance by providing a submerged float which rises and falls in the thickened material as the density of the same increases or decreases, said float being connected with a discharge spigot which is opened and closed by the movement of the float, thus maintaining a spigot discharge of uniform density, and also a discharge which is automatically and continuously maintained in operation.

The actuating force, as previously stated, is due to the fact that a thickened material in which finely divided solids move freely in suspension has physical properties similar to those of a liquid of the same specific gravity as the density of the mixture. Hence, in the form of thickener shown in the accompanying drawings, the actuation may be due to a mixture of colloidal and granular matter in suspension, or by either when unaccompanied by the other, or by liquids of different specific gravity. When the volume discharged through the spigot is such that it lowers the density of the thickened material in which the actuating float is immersed, its buoyancy is diminished in proportion to the lowering of the density and the float thus closes the spigot opening in proportion to its descent. When the volume of discharge through the spigot is such that the density of the thickened material in which the float is immersed increases, its buoyancy increases in proportion to the increase in density and the float naturally rises, opening the spigot in proportion to its rise.

One of the objects of the present invention is therefore to provide means for automatically and continuously maintaining a spigot discharge of uniform density. Another object of the invention is to provide a submerged float which is actuated by the density of the thickened material and to provide means in connection with said float for opening and closing the spigot opening, or for varying the degree of opening of the same. Further objects will hereinafter appear.

The invention consists of the parts and the construction, combination and arrangement of parts as hereinafter more fully described and claimed, having reference to the accompanying drawings in which—

Figure 1:
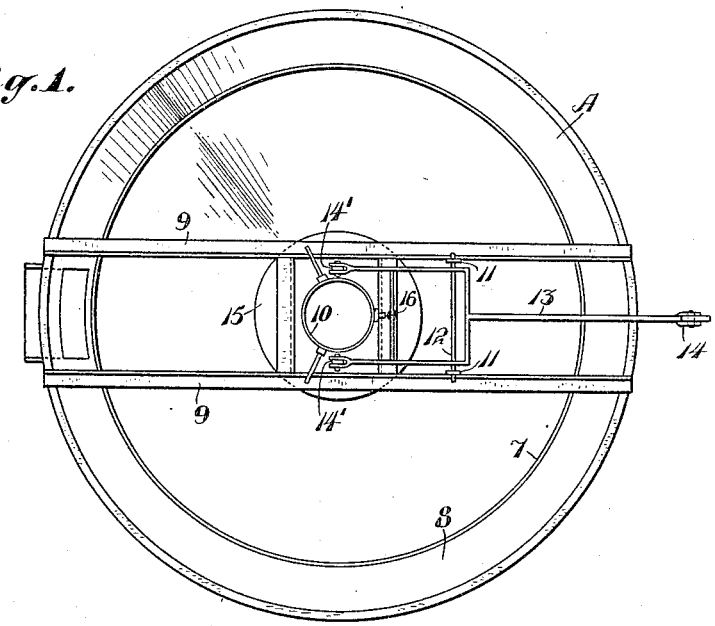
Fig. 1 is a plan view of the slime pulp thickener.
Figure 2:
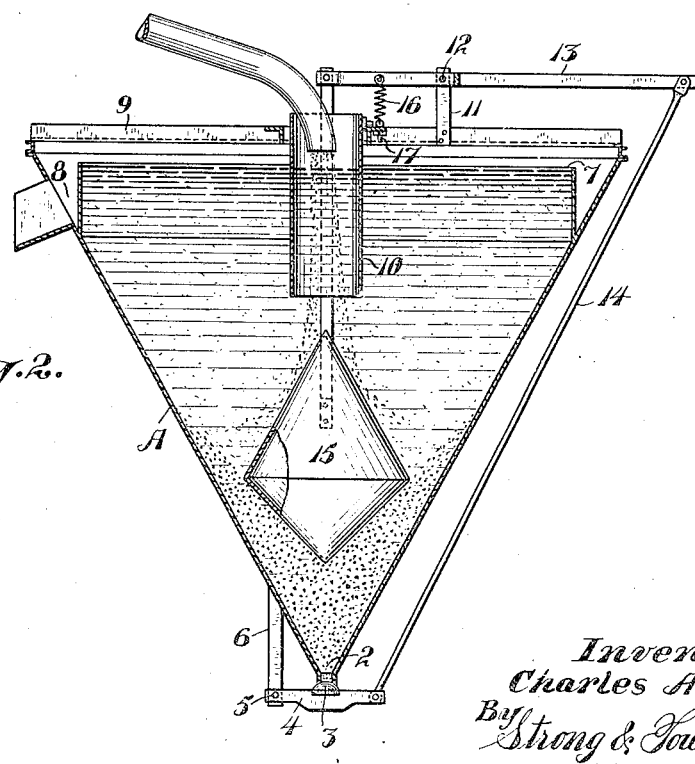
Fig. 2 is a central vertical section through the same.

By "thickening" is meant the concentration of the solids in suspension into a separate product. To accomplish such concentration in a thickener the solids must settle in the thickener, and in order for them to settle agitation must be avoided. To this end and as a means of avoiding agitation I adopt a receptacle, preferably in the form of an inverted cone, with a central feed and rim overflow; the radial lines of flow insuring a constantly decreasing velocity of flow from inlet to overflow and the velocity of the flow at the overflow lip being the slowest possible for the volume of the feed.

With these observations in mind, I have designed not only a practical thickener for treating solids suspended in a liquid but a thickener which is continuous in operation.

Referring to the drawings in detail, A indicates a cone-shaped tank, in the bottom portion of which is formed a discharge opening 2 through which the thickened material is permitted to discharge, the flow through said opening being controlled by a spigot 3 carried by a lever 4, which is pivotally mounted, as at 5, in a bracket 6 secured on the lower end of the tank. Mounted within the upper end of the tank is an annular discharge lip 7, and surrounding said lip is an annular discharge launder 8 through which the lighter slimes and water are permitted to escape.

Extending crosswise of the tank, and approximately centrally of the same, is a pair of cross bars 9 between which is suitably secured a cylindrical spout 10. Also supported upon the bars 9 is a bracket 11, in which is pivotally mounted, as at 12, a lever 13. One end of said lever is connected by a rod 14 with the spigot lever 4, while the opposite end of the lever 13 is connected through the rods 14' with a float 15. This float is at all times maintained in a submerged condition, and its rise and fall are actuated by a variation in the density of the thickened material contained in the tank.

A rise of the float, due to increase in the density of the thickened material, rocks lever 13, thus transmitting movement through the rod 14, which will open the spigot 3 or increase its opening, while decreases in density tranmsits reverse movement, which will correspondingly close the spigot. An automatic and continuous discharge of the thickened material is thereby permitted and a uniform density is also obtained. Practically any density within certain limits may be secured by varying the buoyancy of the float.

This is accomplished in the present instance by providing a spring 16, connected at one end with the lever 13 and at the opposite end with an adjusting screw 17 secured in a bracket supported between the cross bars 9. This adjustment varies the effective buoyancy of the float and therefore permits varying of the density of the discharging thickened material without interrupting the operation of the machine. Weights may be used in connection with lever 13, if desired. A spring has, however, been found preferable to weights when the actuating float is completely immersed, as here shown, as it prevents an unnecessary wide opening of the spigot when there is a momentary large increase in the quantity of solids entering with the feed stream. The normal tension on the spring 16 is such that the buoyancy of the immersed float is insufficient to cause it to rise, and by its rise to open its spigot until the density of the pulp in which it is immersed has increased sufficiently to slightly more than compensate the tension on the spring 16. Varying the tension on spring 16 varies the effective actuating buoyancy of the immersed float, the buoyancy of which varies as varies the density of the surrounding thickened material in which it is immersed, and in this manner is controlled the density of the discharge through the spigot. When the volume discharged through the spigot is such that it lowers the density of the thickened material in which the actuating float is immersed, its buoyancy is diminished in proportion to the lowering of the density and the float thus closes the spigot in proportion to its descent. When the volume of the discharge through the spigot is such that the density of the medium in which the float is immersed increases, its buoyancy increases in proportion to the increase in density and the float rises, opening the spigot in proportion to its rise.

The actuating force available is ample for all practical purposes. As an example: Assume the immersed float to displace 5000 cubic inches, and its weight such that when it is connected to the moving parts and immersed in a fluid of specific gravity 1.0 the spigot 3 is just closed, under these conditions assume that to obtain the desired density of spigot discharge the density of the medium surrounding the immersed float 15 must be 1.25. Omitting inertia and friction, the available actuating force is as the difference in the densities, that is as 1.0:1.25, which gives an available actuating force of approximately 45 pounds when the displacement of the immersed actuating float is 5000 cubic inches.

In actual operation, the pulp is delivered to the cylindrical spout 10 and it here discharges downwardly through the spout. The heavier particles continue in a downward direction or travel towards the discharge spout, while the lighter slimes and water rise to the surface where they finally discharge over the annular lip 7 and escape through the launder 8. The settling of the heavier particles increases the density of the thickened material, thereby, to a certain extent, increasing the specific gravity of the medium surrounding the float. This rises or falls as previously described in proportion to the density of the thickened material, and therefore serves as the actuating member whereby the opening of the spigot is automatically increased or decreased.

While I have designated the member 15 as a float, it will be readily recognized that under normal conditions the member will not posses any buoyance whatsoever and will, of course, be heavier than the liquid within which it is suspended. The properties of buoyancy will be assumed by the float when the density of the solids within the liquid is great enough to overcome the weight of the member 15, this force being exactly determined by adjustment of the spring 16 in addition to the deadweight of the member 15. The word "float", therefore, as used throughout the specification, does not particularly pertain to a constantly buoyant member but to a member which may act in a buoyant manner under certain conditions.

The thickener for a suspension of a solid in a liquid here shown is simple in construction and automatic in operation. The float employed is completely immersed and therefore serves as an actuating member for maintaining a uniform density of the discharging thickened material, the density of the pulp immediately surrounding the actuating member or float being effective as an actuating force. This is a great advantage, as the float is positioned comparatively close to the discharge opening, thereby permitting a more sensitive action and uniform discharge.

The materials and finish of the several parts may be such as the experience and judgment of the manufacturer may dictate.

I wish it understood that various changes in the form, proportions and minor details of construction may be resorted to within the scope of the appended claims, and that I do not wish to limit myself to the specific design and construction here shown.

Having thus described my invention, what I claim and desire to secure by Letters Patent is:

1. A thickener for solids suspended in a liquid, comprising an inverted cone-shaped vessel having a rim overflow and a valve-controlled orifice for the discharge of accumulated material in the bottom thereof, a buoyant member within the vessel in the region where the thickened material accumulates operatively connected with the valve of the discharge orifice, said buoyant member being of a weight and shape to remain depressed and retain the valve closed until such time as the accumulated material in the bottom of the vessel reaches the desired density whereupon it will rise to open the valve and allow such material to be discharged.

2. A thickener as set forth in claim 1 having means for controlling the operation of the buoyant member whereby to vary the degree of density at which the same becomes operative to open the valve.

3. A thickener for solids suspended in a liquid comprising a settling basin type of vessel arranged to permit light and slowly settling particles to overflow its rim and having an orifice at its bottom for the discharge of quickly settling and heavy particles, a valve to control said orifice, an actuator in said vessel in the region where the settled material accumulates, and a mechanical connection between said actuator and valve, said actuator being of a size and shape to remain depressed and retain the valve closed until such time as the accumulated material in the lower portion of the vessel reaches a predetermined density, whereupon it will be buoyed up and open the valve, said mechanical connection being such that the degree of opening or closing of the valve will vary with the extent of movement of the actuator.

4. A thickener for solids suspended in a liquid comprising a settling basin type of vessel arranged to permit light and slowly settling particles to overflow its rim and having an orifice at its bottom for the discharge of quickly settling and heavy particles, a valve to control said orifice and an actuator in said vessel in the region where the settled material accumulates operatively connected to the valve, said actuator being in the form of a double cone and so weighted as to remain depressed and retain the valve closed until such time as the accumulated material in the lower portion of the vessel reaches a predetermined density, whereupon it will be buoyed up and open the valve.

5. A thickener for solids suspended in a liquid, comprising an inverted cone-shaped vessel having a rim overflow and a valve controlled discharge orifice at the bottom thereof, a hollow, buoyant member in the form of a double cone positioned in the vessel immediately above the discharge orifice where the thickened material accumulates, a stem on the buoyant member extending up through the vessel, a frame extending across the top of the vessel, a lever fulcrumed on the frame and connected at one end to the stem, a rod connected to the opposite end of the lever and extending downwardly and outside the vessel, a pivoted arm arranged at the bottom of the vessel and operatively connected to the said rod, a valve on said arm for controlling the discharge orifice, and means included in the connections between the valve and buoyant member for counterbalancing the latter.

In testimony whereof I have hereunto set my hand in the presence of two subscribing witnesses.

CHARLES ALLEN.

Witnesses:
ARTHUR H. SWETT,
EDMUND SHAW.